United States Patent
Van Dijk et al.

(10) Patent No.: US 9,181,429 B2
(45) Date of Patent: Nov. 10, 2015

(54) ANTI-YELLOWING POLYAMIDE COMPOSITION

(75) Inventors: Hans Klaas Van Dijk, Echt (NL); Konraad Dullaert, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/127,634

(22) PCT Filed: May 30, 2012

(86) PCT No.: PCT/EP2012/060111
§ 371 (c)(1),
(2), (4) Date: Mar. 13, 2014

(87) PCT Pub. No.: WO2012/175293
PCT Pub. Date: Dec. 27, 2012

(65) Prior Publication Data
US 2014/0187709 A1    Jul. 3, 2014

(30) Foreign Application Priority Data

Jun. 21, 2011 (EP) .................................... 11170668
Jan. 11, 2012 (EP) .................................... 12150787

(51) Int. Cl.
*C08L 77/06* (2006.01)
*C08K 3/22* (2006.01)

(52) U.S. Cl.
CPC . *C08L 77/06* (2013.01); *C08K 3/22* (2013.01); *C08K 2003/2241* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,399,427 A | * | 3/1995 | Stenger et al. | 428/34.8 |
| 2003/0023008 A1 | * | 1/2003 | Uchida et al. | 525/432 |
| 2009/0088507 A1 | | 4/2009 | Ogasawara | |

FOREIGN PATENT DOCUMENTS

| | | |
|---|---|---|
| EP | 0 388 942 | 9/1990 |
| EP | 1 170 335 | 1/2002 |
| EP | 1 262 525 | 12/2002 |
| JP | 6-212074 | 8/1994 |
| WO | WO 99/16829 | 4/1999 |
| WO | WO 2006/135841 | 12/2006 |

OTHER PUBLICATIONS

International Search Report for PCT/EP2012/060111, mailed May 30, 2012.
Database WPI Week 199435, Accession No. 1994-283477 & JP 6-212074, (Aug. 2, 1994), Abstract, 3 pages.

* cited by examiner

*Primary Examiner* — Ana Woodward
(74) *Attorney, Agent, or Firm* — Nixon & Vanderhye P.C.

(57) ABSTRACT

The invention relates to a polyamide composition with an improved resistance against yellowing. The invention also relates to a shaped article made from the composition and to a method of forming such a shaped article. The polyamide composition comprises: a. 90 to 40 wt % of one or more semi-aromatic polyamides and b.10 to 60 wt % of one or more of aliphatic polyamides and c.1 at least one white pigment as secondary component and c.2 optionally one or more other secondary components, wherein the sum of the amount of semi-aromatic and aliphatic polyamide is 100 wt % and wherein: i. the semi-aromatic polyamide is derived from one or more aliphatic diamine monomers containing 4 to 12 carbon atoms and one or more benzene dicarboxylic acid monomers and ii. the aliphatic polyamide is derived from one or more aliphatic diamine monomers containing 4 to 10 carbon atoms and one or more aliphatic dicarboxylic acids with 6 to 12 carbon atoms with the proviso that no additional thermally conductive material is present in the composition.

13 Claims, 3 Drawing Sheets

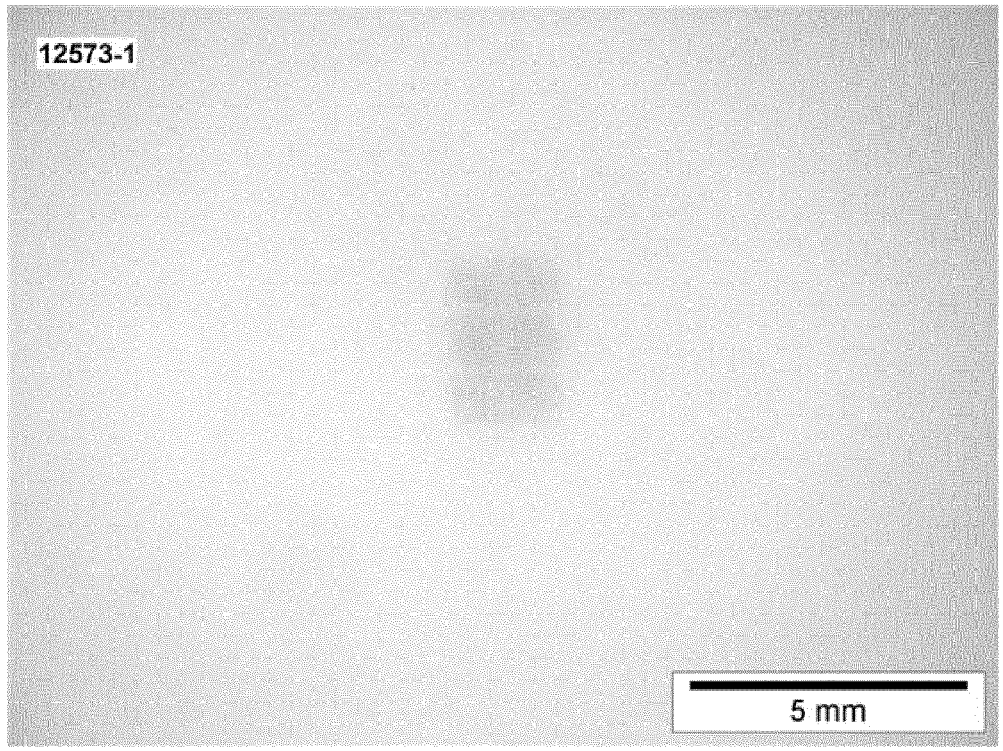
Figure 1: Result of the ageing test with polymer composition 1
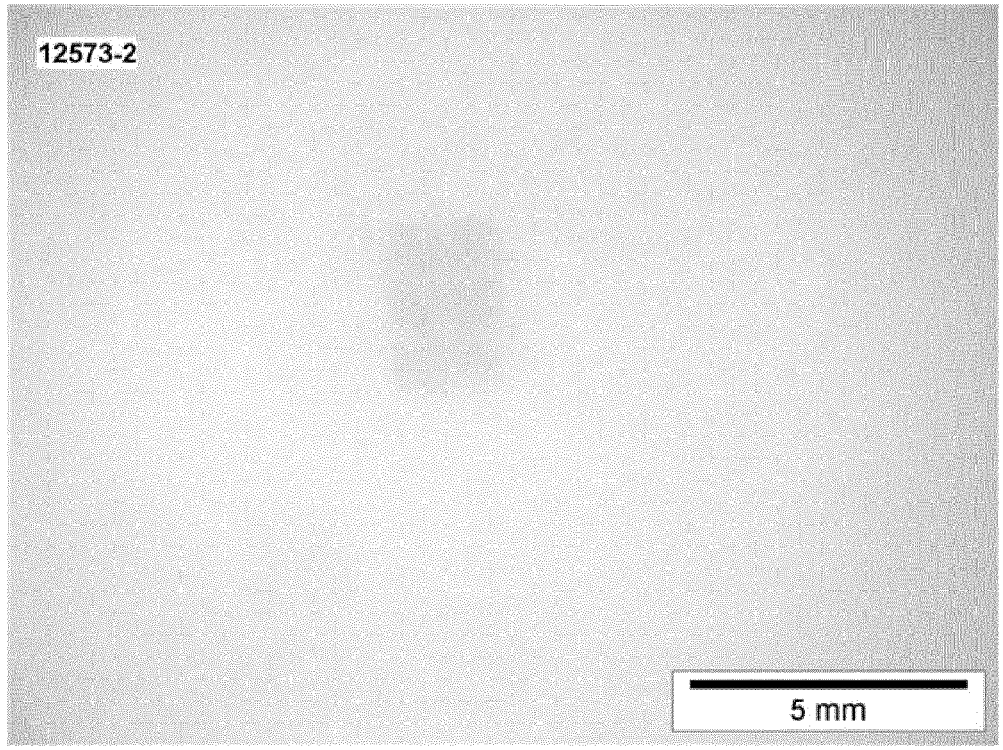
Figure 2: Result of the ageing test with polymer composition 2

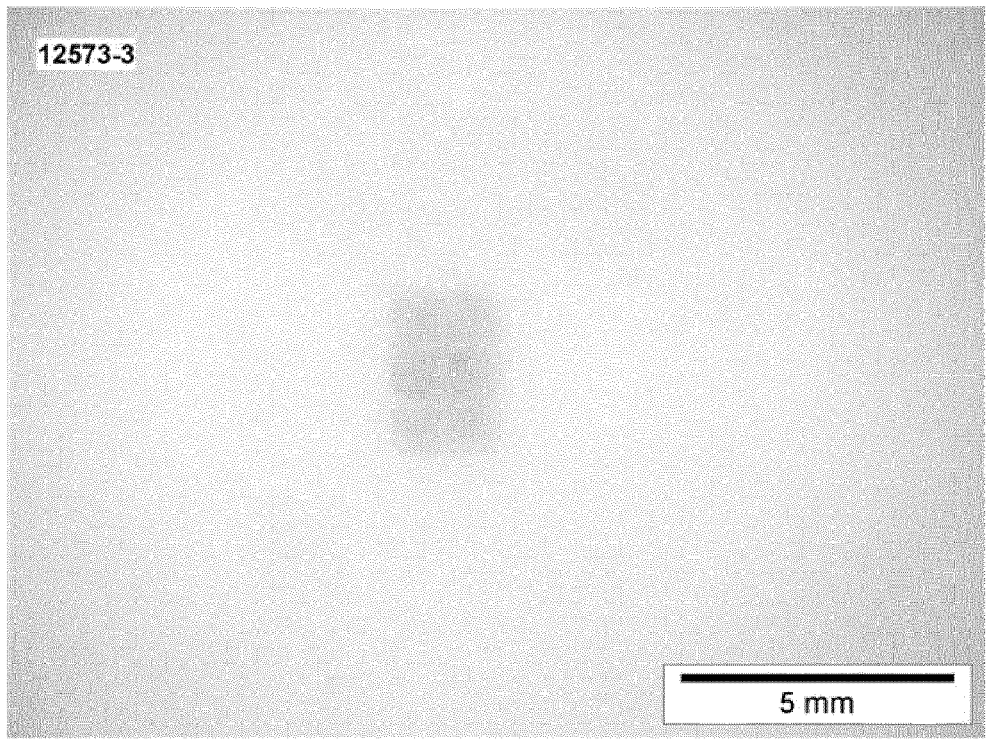
Figure 3: Result of the ageing test with polymer composition 3
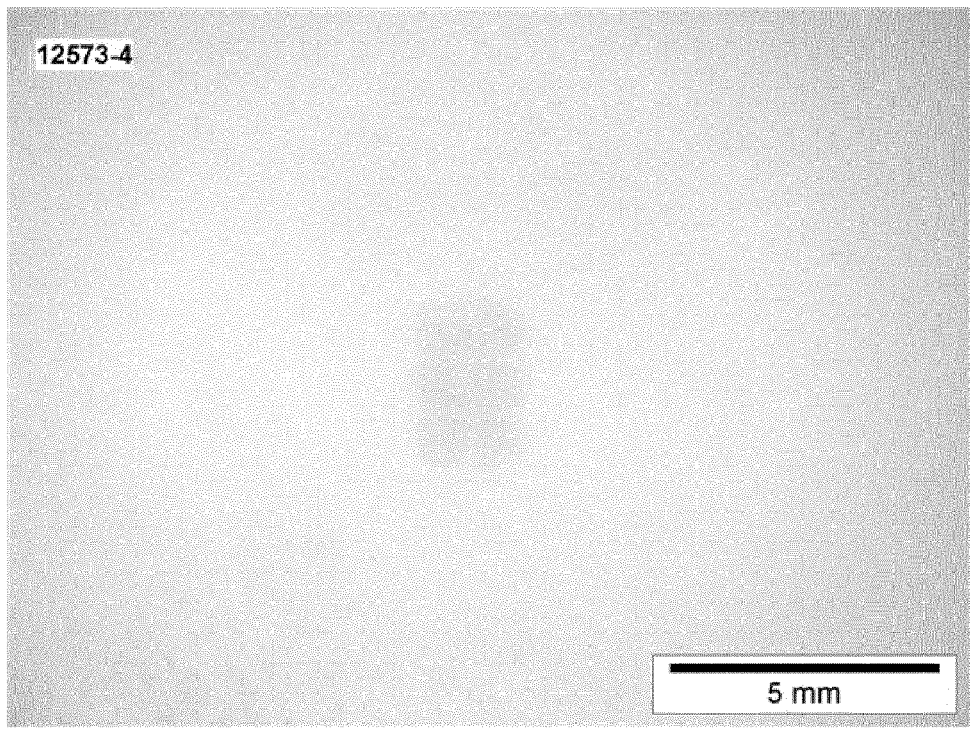
Figure 4: Result of the ageing test with polymer composition 4

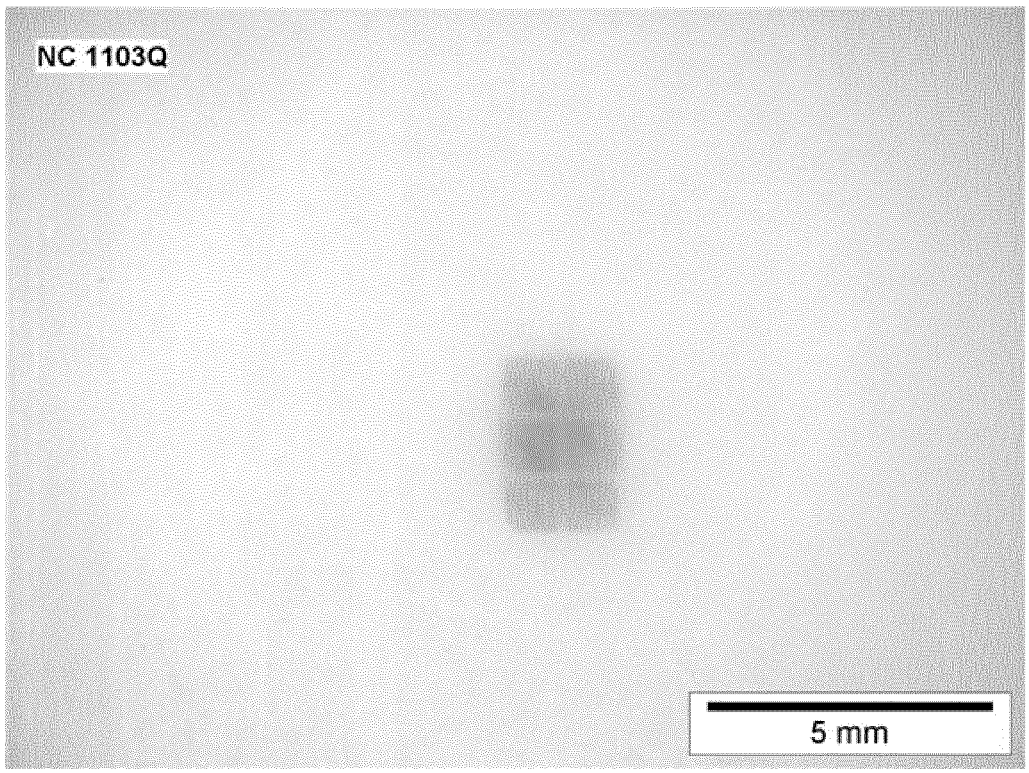
Figure 5: Result of the ageing test with the reference polymer composition

ANTI-YELLOWING POLYAMIDE COMPOSITION

This application is the U.S. national phase of International Application No. PCT/EP2012/060111, filed 30 May 2012, which designated the U.S. and claims priority to EP Application No. 11170668.5, filed 21 Jun. 2011; and EP Application No. 12150787.5, filed 11 Jan. 2012, the entire contents of each of which are hereby incorporated by reference.

FIELD

The invention relates to a polyamide composition with an improved resistance against yellowing. The invention also relates to a shaped article made from the composition and to a method of forming such a shaped article.

BACKGROUND AND SUMMARY

Lighting used for general purposes should preferably be white. Energy-efficient lighting can be obtained by making use of light-emitting diodes (LEDs). LEDs emit light with a very narrow wavelength-band, thereby producing strongly colored light. To obtain white light as required for general purpose lighting 2 main techniques are used. Either light from red, green and blue LEDs is combined or a blue light emitting diode is used in combination with certain phosphors that absorb a part of the blue light and emit light with a broader spectrum of white light.

WO2006/135840 describes a thermally conductive polyamide-based composition that can be used in the manufacturing of components that are used in light-emitting diodes. The composition comprises a semi-aromatic polyamide and at least 30 weight percent of a thermally conductive material.

However, a disadvantage of a composition as described in WO2006/135840 is not only that the addition of a thermally conductive material raises the cost price of the composition and thus of the parts that are made out of that composition, but more importantly, the addition of the thermally conductive material negatively influences the properties of the composition and deteriorates its processing behavior.

Under the influence of blue light and the increased temperature, that inevitably results from the fact that a light source always produces heat next to light, the material that is used to produce components for light-emitting diodes tends to show discoloration. The surface of the material starts to display brown areas. This is sometimes also called yellowing. This yellowing is not only from an aesthetical point of view undesirable. It also diminishes the light yield that is coming from the LED, which is very undesirable, especially in view of environmental concerns.

Although the composition in WO2006/135840 can be used in the manufacture of components that are used in light-emitting diodes, the components suffer from an unsatisfactory performance on certain ageing tests. Therefore there is a need for an improved composition that can be used in the production of components for light-emitting diodes, that is cost effective and that displays improved results for certain ageing behavior, especially an improved resistance against yellowing.

This object is reached by a polymer composition comprising:
a. 90 to 40 wt % of one or more semi-aromatic polyamides and
b. 10 to 60 wt % of one or more of aliphatic polyamides and
c.1 at least one white pigment as secondary component and
c.2 optionally one or more other secondary components, wherein the sum of the amount of semi-aromatic and aliphatic polyamide is 100 wt % and wherein:
 the semi-aromatic polyamide is derived from one or more aliphatic diamine monomers containing 4 to 12 carbon atoms and one or more benzene dicarboxylic acid monomers and
 the aliphatic polyamide is derived from one or more aliphatic diamine monomers containing 4 to 10 carbon atoms and one or more aliphatic dicarboxylic acids with 6 to 12 carbon atoms
with the proviso that no additional thermally conductive material is present in the composition.

BRIEF DESCRIPTION OF THE DRAWINGS

FIGS. 1-5 are photographs of the results of the ageing tests according to the following examples, wherein
FIG. 1 is a photograph of the result of the ageing test for Composition 1;
FIG. 2 is a photograph of the result of the ageing test for Composition 2;
FIG. 3 is a photograph of the result of the ageing test for Composition 3;
FIG. 4 is a photograph of the result of the ageing test for Composition 4; and
FIG. 5 is a photograph of the result of the ageing test for the Reference Composition.

DETAILED DESCRIPTION

The composition according to the invention can be used in the production of components for light-emitting diodes, is cost efficient and has a better behavior towards ageing. The composition comprises a blend of an aliphatic and a semi-aromatic polyamide. It has been found that such a blend displays a very favorable combination of properties. As the temperature of the components that are used in light-emitting diodes inevitably reaches high levels, each component in the blend has to fulfill certain requirements regarding the temperature where the material starts to melt. Additionally the components should be able to retain its shape under all kind of conditions. Also in a humid environment the component should retain its shape. Moisture absorption causes high internal stresses which during ageing deteriorate the light output of the LED. Therefore the composition should have a low level of water absorption.

A further advantage of the composition according to the invention is its advantageous flow behavior. A good flow behavior makes it possible to produce components for light-emitting diodes that have small dimensions, as a good flowing composition is able to flow into all small channels and areas of the mould in which the components are produced. Furthermore, good flowing compositions allow the filling of a higher cavity amount mould, which increases the productivity rate. In this way, components made with the composition according to the invention can generally be produced with thinner walls or with higher amount of cavities (increased productivity) compared to prior art materials, which is very advantageous because of the ever-continuing miniaturization in this field.

Another advantage of the composition according to the invention is its property in the field of reflow solderability. Because the components are primarily used in combination with other electronic components, they need to be soldered into place on, for example, printed circuit boards (PCB). During this soldering process the temperature locally can become very high. The components and thus the composition of which they are made should be able to withstand these high temperatures. The composition according to the invention and the components made therefrom are well adapted to withstand these temperatures and therefore able to withstand the temperatures during reflow soldering.

Further advantageous properties of the polymer composition according to the invention are its good mechanical properties, its capability of withstanding high temperatures and reflective properties.

The polymer composition according to the invention comprises 90 to 40 wt % of one or more semi-aromatic polyamides and 10 to 60 wt % aliphatic polyamides. These weight percentages are based on the total sum of aliphatic and semi-aromatic polyamide, therefore the sum of these two weight percentages is 100%. The semi-aromatic polyamide component a) can be used as a single semi-aromatic polyamide or it can be used as a mixture of two or more semi-aromatic polyamides. The aliphatic polyamide component b) can be used as a single aliphatic polyamide or it can be used as a mixture of two or more aliphatic polyamides. The polymer composition according to the invention preferably comprises 85 to 45 wt % of one or more semi-aromatic polyamides and 15 to 55 wt % aliphatic polyamides, more preferably the composition comprises 80 to 50 wt % of one or more semi-aromatic polyamides and 20 to 50 wt % aliphatic polyamides.

With "semi-aromatic" polyamide is meant a polyamide made of at least one monomer that has at least one structural unit with an aromatic character and at least one monomer with only structural units with an aliphatic character.

The semi-aromatic polyamide can be a homo- or copolymer and is derived from one or more diamine monomers containing 4 to 12 carbon atoms and one or more benzene dicarboxylic acid monomers. The diamine containing 4 to 12 carbon atoms is an aliphatic amine; this also includes for example a straight chain, branched chain and cyclo-aliphatic amine. Preferably the diamine has a straight chain. The number of carbon atoms in the diamine is not particularly relevant as long as the carbon chain is not shorter than 4 carbon atoms and not longer than 12 carbon atoms. Preferably the diamine has 4 or 6 carbon atoms. With an amine of this length advantageously high melting temperatures of the polyamide can be reached. More preferably the diamine has 4 carbon atoms, most preferably the diamine is diamino-butane. The diacid in the semi-aromatic polyamide is a benzene dicarboxylic acid or mixtures thereof. Preferably the benzene dicarboxylic acid is terephthalic acid or isophthalic acid or mixtures thereof. More preferably the acid is terephthalic acid.

When a homopolymer is used as the semi-aromatic polyamide preferably PA 4T, PA 4I, PA 6T or PA 6I is used. Here and hereinafter polyamide will also be referred to as "PA". Further indication of the polyamide is in line with International Standard ISO 1874-1: 1992 (E). The first position after "PA" generally indicates the nature of the amine, the second position indicates the nature of the acid. Thus the "4" in PA4T or PA4I indicates that the amine contains 4 carbon atoms. The "6" in PA6T or PA6I indicates that the amine contains 6 carbon atoms. The "T" in PA4T or PA6T indicates that the acid is terephthalic acid; the "I" in PA4I or PA6I indicates that the acid is isophthalic acid.

The semi-aromatic polyamide can be a copolymer such as for example PA 66/6T or PA 10T/106. With PA 66/6T is meant a copolyamide that comprises as building blocks a diamine derivative with 6 carbon atoms and as diacid derivatives terephthalic acid and a diacid with 6 carbon atoms. With PA 10T/106 is meant a copolyamide that comprises as building blocks a diamine derivative with 10 carbon atoms and as diacid derivatives terephthalic acid and a diacid with 6 carbon atoms. When a copolymer is used as the semi-aromatic polyamide preferably PA 4T/6T, PA 4T/66 or PA 66/6T is used as they provide for a higher stiffness in the relevant temperature range. Here and hereinafter the term copolymer is not meant to be limited to binary copolymers. Also ternary and higher copolymers are included in this term.

The diacid in the synthesis of the semi-aromatic polyamide can be used in its di-acid form, however also acid-derivatives, such as for example acid chlorides and -esters are suitable.

The aliphatic polyamide can be a homo- or copolymer and is derived from one or more diamine monomers containing 4 to 10 carbon atoms and one or more aliphatic dicarboxylic acids with 6 to 12 carbon atoms. As the polyamide is aliphatic, both the diamine and the diacid are aliphatic in nature. The diamine containing 4 to 10 carbon atoms is an aliphatic amine; this also includes for example a straight chain, branched chain and cyclo-aliphatic amine. Preferably the diamine has a straight chain. The number of carbon atoms in the diamine is not particularly relevant as long as the carbon chain is not shorter than 4 carbon atoms and not longer than 10 carbon atoms. Also mixtures of diamines can be used. Preferably the diamine has 4 or 6 carbon atoms. With an amine of this length advantageously high melting temperatures can be reached. More preferably the diamine is diamino-butane as the polyamide obtained when using diamino-butane has a higher melting temperature than a polyamide with the same total number of carbon atoms in the monomers and wherein the diamine has a higher number of carbon atoms than 4.

The di-acid in the aliphatic polyamide is one or more aliphatic dicarboxylic acids with 6 to 12 carbon atoms. The aliphatic di-acid can be for example a straight chain, branched chain and cyclo-aliphatic di-acid. Preferably the di-acid is a straight chain di-acid. The di-acid can for example be adipic acid, pimelic acid, suberic acid, azelaic acid or sebacic acid. Preferably the di-acid is sebacic acid. The diacid can be used during the synthesis of the polyamide in its di-acid form, however also acid-derivatives, such as for example acid chlorides and -esters are suitable. Preferred aliphatic polyamides are PA410, PA46 and PA66.

In the polymer composition according to the invention certain combinations of semi-aromatic polyamides with aliphatic polyamides are especially advantageous. Therefore preferably use is made of a composition wherein the composition comprises the combination of a homo- or copolymer of polyamide-4T with a homo- or copolymer of polyamide-410 or the combination of a homo- or copolymer of polyamide-4T with a homo- or copolymer of polyamide-46 or the combination of a homo- or copolymer of polyamide-10T with a homo- or copolymer of polyamide-410 or the combination of a homo- or copolymer of polyamide-4T with a homo- or copolymer of polyamide-66. Also combinations with a homo- or copolymer of polyamide-6T, polyamide-8T, polyamide-9T or polyamide-10T as one of the polyamide components are very suitable. Examples of those combinations are a homo- or copolymer of PA-9T with a homo- or copolymer of PA-410, a homo- or copolymer of PA-9T with a homo- or copolymer of PA-66, the copolymer of PA-6T/66 with a homo- or copolymer of PA-410 or the copolymer of PA-6T/66 with a homo- or copolymer of PA-66.

With "polyamide 4T" is meant a polyamide that comprises as building blocks a diamine derivative with 4 carbon atoms and a terephthalic acid derivative. With "polyamide 410" is meant a polyamide that comprises as building blocks a diamine derivative with 4 carbon atoms and a diacid derivative with 10 carbon atoms. With "polyamide 46" is meant a polyamide that comprises as building blocks a diamine derivative with 4 carbon atoms and a diacid derivative with 6 carbon atoms. With "polyamide 10T" is meant a polyamide that comprises as building blocks a diamine derivative with 10 carbon atoms and a terephthalic acid derivative. With "polyamide 66" is meant a polyamide that comprises as building blocks a diamine derivative with 6 carbon atoms and a diacid derivative with 6 carbon atoms.

With "a copolymer of polyamide-4T" it is meant to describe in a general way a class of copolymers that at least comprise the building blocks used to prepare the homopolymer PA-4T. As it is a copolymer other building blocks will be present. Other copolymers can be indicated in the same manner.

The composition according to the present invention comprises at least one white pigment as secondary component. Examples of suitable white pigments are titanium dioxide (preferably in its rutile structure), zinc sulfide, zinc oxide, barium sulfate and potassium titanate. More preferably titanium dioxide is used as the white pigment. The composition according to the present invention can optionally comprise one or more other secondary components. Suitable non-limiting examples for use in the present composition are other pigments than a white pigment, reinforcing filler, thermal stabilizer, (ultraviolet) light stabilizer, oxidative stabilizer, flame retardant, colorant, dye, or mold release agent. Other secondary additives that are advantageously used in the compositions according to the invention are reinforcing fibers and/or stabilizers. Examples of suitable reinforcing fibers are synthetic polymeric fibers, glass fibers and oxides of metals. Preferably glass fibers are used.

The secondary component is generally present in an amount up to 70 wt % of the total weight of the composition. Preferably the amount of secondary components is at most 65 wt %, more preferably at most 60 wt %. The minimum amount of secondary components can be 0 wt %. Preferably at least 10 wt %, more preferably at least 20 wt % of secondary component is present. These amounts are based on the total weight of the composition and refer to the total amount of all secondary components. Within one class of secondary components more than one component with the same general function can be used in the composition according to the invention. For example it is possible to use only one type of white pigment; however it is also possible to use a combination of two or more white pigments. The same holds for the other secondary components.

For the amount of individual secondary components some suitable ranges can be given. The amount of white pigment is generally between 0.1 and 50 wt %. Preferably the white pigment is present in an amount of at least 10 wt %, more preferably at least 25 wt %. The amount of reinforcing fiber is generally between 0 and 40 wt %. Preferably the reinforcing fiber is present in an amount of at least 5 wt %, more preferably at least 10 wt %. The amount of reinforcing fiber in the composition according to the invention is at most 40 wt %, preferably at most 30 wt %, more preferably at most 20 wt %. These amounts are based on the total weight of the composition. When one or more stabilizers are used in the composition according to the invention each of them is generally used in an amount of up to 1 wt %, preferably up tot 0.5 wt %, more preferably up to 0.25 wt %. These amounts are calculated based on the total weight of the composition according to the invention.

The polymer composition according to the invention does not contain an additional thermally conductive material. With thermally conductive material is here and hereinafter meant a material that dissipates heat from the source of the heat. Such materials have a thermal conductivity of at least 1 watts/m·K. Typically plastics have a thermal conductivity in the range of 0.3-0.5 watts/m·K. Thermal conductivity is determined according to the method described in ASTM-E1461-07. Thus an additional thermally conductive material is not present in the composition according to the invention.

The polyamides used in the composition according to the invention can be produced via methods well-known to the man skilled in the art. An example of such a method, which is meant to illustrate a possible method and which is not meant to be a limiting example is WO00/09586.

The composition according to the invention may be prepared by mixing the one or more semi-aromatic polyamides, the one or more aliphatic polyamides, the white pigment and optionally the one or more other secondary components then melt compounding the mix to form the composition according to the invention. The melt compounding can may be carried out by methods generally known to the man skilled in the art. Examples of suitable melt compounding techniques are in a single or twin screw extruder or a Haake kneader.

The polymer composition according to the invention is suitable for use in the preparation of shaped articles. Those shaped articles can for example be components associated with light-emitting diodes. Examples of such shaped articles are a reflector, reflector cup, scrambler or housing.

Those shaped articles made out of the composition according to the invention have very beneficial properties such as for example an improved behavior towards ageing or yellowing compared to prior art articles, a high dimensional stability, are light-weight and thin-walled and are able to withstand soldering into a more complex structure. Therefore the invention also relates to a shaped article made out of the composition according to the invention.

Methods of forming a shaped article are well-known to the man skilled in the art. Generally such a method comprises at least the steps of providing a polymer and molding the polymer to form the shaped article. When the polymer used in the method of forming a shaped article is the polymer composition according to the invention then the shaped articles obtained from this method are having the beneficial properties mentioned before. Therefore the present invention also relates to a method of forming a shaped article comprising at least the steps of providing the polymer composition according to the present invention and molding the composition to form the shaped article. The present invention also relates to the shaped article obtainable from this method.

The present invention is further explained in the following examples without being limited to them.

EXAMPLES

Preparation of the Polymer Composition

Composition 1

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. The melt temperature of the composition upon exiting the extruder was 355° C. The strands of polymer composition leaving the extruder were cooled in a water bath and granulated according to procedures well-known in the art.

The polymer consisted of a 3:1 mixture of Polyamide ForTii® (a semi-aromatic polyamide from DSM Engineering Plastics) and Polyamide-410 (EcoPaxx®, an aliphatic polyamide from DSM Engineering Plastics). The viscosity numbers of these polymers were 100 ml/gram and 90 ml/gram respectively, as determined by a internal DSM method (see for description below).

Composition 2

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. The melt temperature of the composition upon exiting the extruder was 350° C. The strands of polymer composition leaving the extruder, were cooled in a water bath and granulated according to procedures well-known in the art.

The polymer consisted of a 55:45 mixture of Polyamide ForTii® (from DSM Engineering Plastics) and Polyamide-410 (EcoPaxx® from DSM Engineering Plastics). The viscosity numbers of these polymers were 100 ml/gram and 90 ml/gram respectively, as determined by an internal DSM method (see for description below).

Composition 3

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. Melt temperature upon exiting the extruder of the compound was 358° C. The strands of polymer composition leaving the extruder, were cooled in a water bath and granulated according to procedures well-known in the art.

The polymer consisted of a 3:1 mixture of Polyamide ForTii® (from DSM Engineering Plastics) and Polyamide-410 (EcoPaxx® (DSM Engineering Plastics). The viscosity numbers of the polymers were 100 ml/gram and 150 ml/gram respectively, as determined by an internal DSM method (see for description below).

Composition 4

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. Melt temperature of the compound upon exiting the extruder was 354° C. The strands of polymer composition leaving the extruder, were cooled in a water bath and granulated according to procedures well-known in the art.

The polymer consisted of a 55:45 mixture of Polyamide ForTii® (from DSM Engineering Plastics) and Polyamide-410 (EcoPaxx® (DSM Engineering Plastics). The viscosity numbers of the polymers were 100 ml/gram and 150 ml/gram respectively, as determined by a DSM method (see for description below).

Composition 5

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. Melt temperature of the compound upon exiting the extruder was 354° C. The strands of polymer composition leaving the extruder, were cooled in a water bath and granulated according to procedures well-known in the art.

The polymer consisted of a 55:45 mixture of Polyamide ForTii® (from DSM Engineering Plastics) and Polyamide-46 (Stanyl® (DSM Engineering Plastics). The viscosity numbers of the polymers were 100 ml/gram and 160 ml/gram respectively, as determined by a DSM method (see for description below).

Reference (Not According to the Invention)

35 parts (by weight) of $TiO_2$ were mixed with 15 parts of glass fibre and 49.6 parts of polymer on a twin screw extruder. Final components were 0.2 parts of Irganox 1098 and 0.2 parts of Nylostab-S-EED. The melt temperature of the compound upon exiting the extruder was 355° C. The strands were cooled in a water bath and granulated according to procedures well-known in the art.

The polymer consisted of PA ForTii® (DSM Engineering Plastics). The viscosity number of this polymer was 100 ml/gram.

Methods Used

Spiral Flow Measurements

Spiral flow measurements were carried out on an Engel 22 mm injection molding machine. Spiral thickness was 1 mm. Before starting the experiments the materials were dried to a moisture level of 600-800 ppm (as determined by the Karl Fisher method).

Injection molding machine settings were such that the injected melt had a temperature of 335° C. Injection pressures used were respectively 800, 900 and 1000 bar.

For each injection pressure 10 spirals were molded and the average length of the spirals was determined. The average value was recorded as the flow length.

Viscosity Number Determination

Viscosity number determinations were carried out according to ISO 307.

Light/Heat Ageing Test

Plates made out of the compositions given above were irradiated with blue light via the use of an OSTAR® LE W E3A LED module (6 chips) from Osram. The module was driven at 650 mA. The dimensions of the plates used in the test were 80×80×2 mm. With a lens the output was focused onto the plate. The surface temperature of the plate was 130° C. Irradiation time was 6 hours.

The results of the ageing tests are displayed in the FIGS. 1-5

TABLE I

| | Spiral flow | | | |
|---|---|---|---|---|
| | 800 bar | 900 bar | 1000 bar | |
| Composition 1 | 92 | 100 | 111 | 12573-001 |
| Composition 2 | 115 | 129 | 131 | 12573-002 |
| Composition 3 | 85 | 92 | 104 | 12573-003 |
| Composition 4 | 98 | 109 | 115 | 12573-004 |
| Composition 5 | 92 | 100 | 110 | — |
| Reference compostion | 73 | 79 | 86 | NC1103Q |

The invention claimed is:
1. A polymer composition comprising:
(a.) 90 to 40 wt % of at least one semi-aromatic polyamide;
(b.) 10 to 60 wt % of at least one aliphatic polyamide;
(c.1) at least one white pigment; and

(c.2) optionally at least one secondary component, wherein the sum of the amount of the at least one semi-aromatic polyamide and the at least one aliphatic polyamide is 100 wt % and the at least one white pigment is present in an amount of at least 10 wt. %, calculated based on the total weight of the composition, and wherein:
(i.) the semi-aromatic polyamide is derived from one or more aliphatic diamine monomers containing 4 to 12 carbon atoms and one or more benzene dicarboxylic acid monomers;
(ii.) the aliphatic polyamide is derived from one or more aliphatic diamine monomers containing 4 to 10 carbon atoms and one or more aliphatic dicarboxylic acids with 6 to 12 carbon atoms; and
(iii.) the diamine in the at least one semi-aromatic polyamide comprises diamino butane.

2. The polymer composition according to claim 1, wherein the dicarboxylic acid monomer in the at least one aliphatic polyamide is at least one selected from the group consisting of adipic acid, pimelic acid, suberic acid, azelaic acid and sebacic acid.

3. The polymer composition according to claim 1, wherein the dicarboxylic acid monomer in the at least one semi-aromatic polyamide is terephthalic acid.

4. The polymer composition according to claim 3, wherein the composition comprises
the combination of a homo- or copolymer of polyamide-4T with a homo- or copolymer of polyamide-410, or
the combination of a homo- or copolymer of polyamide-4T with a homo- or copolymer of polyamide-46, or
the combination of a homo- or copolymer of polyamide-4T with a homo- or copolymer of polyamide-66.

5. The polymer composition according to claim 1, wherein the diamine monomer in each of the at least one aliphatic polyamide and the at least one semi-aromatic polyamide is diamino butane.

6. The polymer composition according to claim 1, wherein the at least one secondary component is selected from the group consisting of pigments, reinforcing fillers, thermal stabilizers, light stabilizers, oxidative stabilizers, and mold release agents.

7. The polymer composition according to claim 1, wherein the at least one white pigment comprises titanium dioxide.

8. The polymer composition according to claim 6, wherein the at least one secondary component comprises a reinforcing fiber.

9. The polymer composition according to claim 6, wherein the at least one secondary component is present in an amount up to 70 wt. %, based on the total weight of the composition.

10. A method of forming a shaped article comprising at least the steps of providing the polymer composition according to claim 1, and molding the composition to form the shaped article.

11. A shaped article formed from the composition according to claim 1.

12. The shaped article according to claim 11, wherein the shaped article is an article associated with a light emitting diode (LED) component.

13. The shaped article according to claim 12, wherein the LED component is a reflector, a reflector cup, a scrambler, or a housing.

* * * * *